United States Patent
Schick et al.

(10) Patent No.: US 11,358,631 B2
(45) Date of Patent: Jun. 14, 2022

(54) DUAL MARGIN PRIORITY CIRCUIT FOR INCREASED STEERING CAPACITY

(71) Applicant: DEERE & COMPANY, Moline, IL (US)

(72) Inventors: Troy E. Schick, Cedar Falls, IA (US); Ryan Pence, Cedar Falls, IA (US); Aaron M. Quinn, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 455 days.

(21) Appl. No.: 16/431,795

(22) Filed: Jun. 5, 2019

(65) Prior Publication Data

US 2019/0283799 A1   Sep. 19, 2019

Related U.S. Application Data

(62) Division of application No. 15/428,524, filed on Feb. 9, 2017, now Pat. No. 10,377,414.

(51) Int. Cl.
  *B62D 5/07* (2006.01)
  *F15B 13/00* (2006.01)
  *F15B 11/16* (2006.01)

(52) U.S. Cl.
  CPC ............ *B62D 5/075* (2013.01); *F15B 11/162* (2013.01); *F15B 11/165* (2013.01); *F15B 13/00* (2013.01); *F15B 2211/20546* (2013.01); *F15B 2211/30535* (2013.01); *F15B 2211/6051* (2013.01); *F15B 2211/6054* (2013.01); *F15B 2211/6057* (2013.01); *F15B 2211/781* (2013.01)

(58) Field of Classification Search
  CPC ................................ B62D 5/075; F15B 13/00
  See application file for complete search history.

(56) References Cited

U.S. PATENT DOCUMENTS

| | | | |
|---|---|---|---|
| 5,927,072 A | * | 7/1999 | Vannette .................. B60T 8/18 60/452 |
| 6,206,481 B1 | | 3/2001 | Kaisers et al. |

(Continued)

FOREIGN PATENT DOCUMENTS

| | | | |
|---|---|---|---|
| DE | 19955797 A1 | 5/2001 | |
| DE | 102008009043 | 5/2009 | |
| JP | 6831648 B2 * | 2/2021 | ............ F15B 11/165 |

*Primary Examiner* — Kevin Hurley
(74) *Attorney, Agent, or Firm* — Taft Stettinius & Hollister LLP; Stephen F. Rost

(57) ABSTRACT

A dual pressure margin priority circuit and method for controlling flow from a pump to steering valve and low priority inlets. A steering pressure valve controls flow from pump to steering valve inlets, and provides a steering valve load sense pressure. A priority valve controls flow from pump to low priority inlets. A load sense cutoff valve has a first inlet receiving the steering valve load sense pressure. The load sense cutoff valve controls flow through the priority valve based on steering valve load sense pressure at the first cutoff valve inlet. The cutoff valve can include a second inlet coupled to tank, and a load sense input coupled to the steering valve load sense pressure. The cutoff valve can be a pressure limiter valve. The priority and steering pressure valves can be 2-way proportional flow spool valves with bias springs, and contributing and opposing load sense inputs.

13 Claims, 4 Drawing Sheets

(56) References Cited

U.S. PATENT DOCUMENTS

| | | | | |
|---|---|---|---|---|
| 7,451,686 | B2* | 11/2008 | Graeve | B62D 1/22 |
| | | | | 60/422 |
| 7,614,335 | B2* | 11/2009 | Gradea | E02F 9/2225 |
| | | | | 91/444 |
| 8,387,289 | B2 | 3/2013 | Hanakawa et al. | |
| 8,589,026 | B2 | 11/2013 | Holt et al. | |
| 8,974,011 | B2 | 3/2015 | Schick et al. | |
| 2014/0129035 | A1* | 5/2014 | Marquette | F15B 19/002 |
| | | | | 700/282 |
| 2015/0239441 | A1 | 8/2015 | Kolstermann et al. | |
| 2015/0285241 | A1 | 10/2015 | Bang et al. | |
| 2015/0344011 | A1 | 12/2015 | Casali et al. | |
| 2016/0002017 | A1 | 1/2016 | Ueda et al. | |
| 2016/0244090 | A1* | 8/2016 | McIlheran | B62D 5/093 |
| 2020/0114956 | A1* | 4/2020 | Rahimzai | B62D 5/09 |
| 2021/0300466 | A1* | 9/2021 | Benevelli | F15B 11/168 |

* cited by examiner

DUAL MARGIN PRIORITY CIRCUIT FOR INCREASED STEERING CAPACITY

RELATED APPLICATIONS

This is a divisional application of U.S. patent application Ser. No. 15/428,524, filed Feb. 9, 2017, the disclosure of which is hereby incorporated by reference in its entirety.

FIELD OF THE DISCLOSURE

The present disclosure relates to hydraulic systems, and more particularly to a system and method to adjust hydraulic flow between higher and lower priority hydraulic functions.

BACKGROUND

Increases in tractor size/tires/tracks/mass are all resulting in higher steering force requirements. Steering force is limited by the hydraulic pressure available to the steering circuit and/or the size of the steering actuators. Increasing steering pressure is the most cost effective way to increase steering capacity as it requires minimal modification to the steering valve and chassis components. Traditionally, a single spool/single pressure margin priority valve with a load sense relief feature is used to provide oil to a hydraulic steering circuit. The load sense relief valve is used to prevent the priority valve from blocking flow to low priority hydraulic functions when steering pressure reaches the relief setting. This approach reduces the maximum pressure available at the steering valve inlet to less than 90% of the maximum pump outlet pressure.

It would be desirable to enable the steering circuit to utilize the maximum pump pressure.

SUMMARY

A dual pressure margin priority circuit is disclosed that controls flow from a hydraulic pump to steering valve inlets and to low priority function inlets. The dual pressure margin priority circuit includes a steering pressure compensation valve, a priority valve, a load sense cutoff valve and a load sense feed orifice. The steering pressure compensation valve has an inlet port hydraulically coupled to the pump and an outlet port hydraulically coupled to the steering valve inlets. The load sense feed orifice has an inlet port hydraulically coupled to the outlet port of the steering pressure compensation valve to provide a steering valve dynamic load sense pressure. The load sense cutoff valve has a first inlet port hydraulically coupled to the outlet port of the load sense feed orifice. The priority valve has an inlet port hydraulically coupled to the pump and an outlet port hydraulically coupled to the low priority function inlets. The load sense cutoff valve controls flow from the pump to the low priority function inlets through the priority valve based on the steering valve dynamic load sense pressure at the first inlet port of the load sense cutoff valve.

The pump can be a pressure compensated hydraulic pump that includes a load sense input, and the dual pressure margin priority circuit can also include a load sense resolution shuttle valve with a first inlet port hydraulically coupled to the steering valve dynamic load sense pressure, a second inlet port hydraulically coupled to a low priority function load sense pressure and an outlet port hydraulically coupled to the load sense input of the pump. The load sense resolution shuttle valve can communicate the greater of the steering valve dynamic load sense pressure at the first inlet port and the low priority function load sense pressure at the second inlet port to the load sense input of the pump.

The load sense cutoff valve can also include a bias spring, a second inlet port hydraulically coupled to a tank, and a load sense input hydraulically coupled to the steering valve dynamic load sense pressure at the first inlet port of the load sense cutoff valve. When the force of the bias spring is greater than the force of the steering valve dynamic load sense pressure at the load sense input of the load sense cutoff valve, the load sense cutoff valve can communicate the steering valve dynamic load sense pressure at the first inlet port to the outlet port. When the force of the bias spring is less than the force of the steering valve dynamic load sense pressure at the load sense input of the load sense cutoff valve, the load sense cutoff valve can connect the outlet port to the tank. The force of the bias spring of the load sense cutoff valve can be adjustable.

The priority valve can be a 2-way proportional flow spool valve that also includes a bias spring, a contributing load sense input hydraulically coupled to the outlet port of the load sense cutoff valve, and an opposing load sense input hydraulically coupled to the outlet port of the steering pressure compensation valve. Pressure at the contributing load sense input of the priority valve can aid the biasing force of the bias spring to stop flow from the inlet port to the outlet port of the priority valve, and pressure at the opposing load sense input of the priority valve can oppose the biasing force of the bias spring to open flow from the inlet port to the outlet port of the priority valve.

The steering pressure compensation valve can be a 2-way proportional flow spool valve that also includes a bias spring, a contributing load sense input hydraulically coupled to the outlet port of the load sense feed orifice, and an opposing load sense input hydraulically coupled to the outlet port of the steering pressure compensation valve. Pressure at the contributing load sense input of the steering pressure compensation valve can aid the biasing force of the bias spring to open flow from the inlet port to the outlet port of the steering pressure compensation valve, and pressure at the opposing load sense input of the steering pressure compensation valve can oppose the biasing force of the bias spring to stop flow from the inlet port to the outlet port of the steering pressure compensation valve.

The dual pressure margin priority circuit can also include a load sense boost orifice with an inlet port hydraulically coupled to the outlet port of the load sense feed orifice, and an outlet port hydraulically coupled to the first inlet port of the load sense cutoff valve and to the first inlet port of the load sense resolution shuttle valve. Alternatively, the dual pressure margin priority circuit can include a load sense boost orifice with an inlet port hydraulically coupled to the outlet port of the load sense feed orifice, and an outlet port of the load sense boost orifice hydraulically coupled to the first inlet port of the load sense resolution shuttle valve.

The load sense cutoff valve can be a pressure limiting valve that also includes a bias spring, a load sense input hydraulically coupled to the steering valve dynamic load sense pressure at the first inlet port of the load sense cutoff valve, and have the outlet port hydraulically coupled to a tank. When the force of the bias spring is greater than the force of the steering valve dynamic load sense pressure at the load sense input of the load sense cutoff valve, the load sense cutoff valve can block flow from the inlet port to the outlet port of the load sense cutoff valve; and when the force of the bias spring is less than the force of the steering valve dynamic load sense pressure at the load sense input of the load sense cutoff valve, the load sense cutoff valve can open flow from the inlet port to the outlet port of the load sense cutoff valve. The force of the bias spring of this type of pressure limiting load sense cutoff valve can be adjustable.

With a pressure limiting load sense cutoff valve, the priority valve can be a 2-way proportional flow spool valve that also includes a bias spring, a contributing load sense input hydraulically coupled to the inlet port of the load sense cutoff valve, and an opposing load sense input hydraulically coupled to the outlet port of the steering pressure compensation valve. Pressure at the contributing load sense input of the priority valve can aid the biasing force of the bias spring to stop flow from the inlet port to the outlet port of the priority valve, and pressure at the opposing load sense input of the priority valve can oppose the biasing force of the bias spring to open flow from the inlet port to the outlet port of the priority valve.

A method of controlling flow from a hydraulic pump to steering valve inlets and to low priority function inlets is disclosed that includes controlling flow from the pump to the steering valve inlets using a steering valve; sensing a steering valve dynamic load sense pressure at an outlet port of the steering valve; controlling flow from the pump to the low priority function inlets using a priority valve; controlling a load sense cutoff valve using the steering valve dynamic load sense pressure; and controlling flow from the pump to the low priority function inlets through the priority valve using the load sense cutoff valve based on the steering valve dynamic load sense pressure. The priority valve and the steering valve are separate valves.

Controlling a load sense cutoff valve using the steering valve dynamic load sense pressure can include hydraulically coupling the steering valve dynamic load sense pressure through the load sense cutoff valve from an inlet port of the load sense cutoff valve to a load sense input of the priority valve when the steering valve dynamic load sense pressure is less than a threshold pressure; and hydraulically coupling the load sense input of the priority valve through the load sense cutoff valve from an outlet port of the load sense cutoff valve to a tank when the steering valve dynamic load sense pressure is greater than a threshold pressure. Controlling flow from the pump to the low priority function inlets using a priority valve can include hydraulically coupling the outlet port of the load sense cutoff valve to a contributing load sense input of the priority valve; hydraulically coupling the outlet port of the steering valve to an opposing load sense input of the priority valve; biasing the priority valve to block flow from the pump to the low priority function inlets using a priority bias spring force and the contributing load sense input of the priority valve; and biasing the priority valve to open flow from the pump to the low priority function inlets using the opposing load sense input of the priority valve. Controlling flow from the pump to the steering valve inlets using a steering valve can include hydraulically coupling the outlet port of the steering valve to an inlet port of a load sense feed orifice; hydraulically coupling an outlet port of the load sense feed orifice to a contributing load sense input of the steering valve; hydraulically coupling the outlet port of the steering valve to an opposing load sense input of the steering valve; biasing the steering valve to open flow from the pump to the steering valve inlets using a steering bias spring force and the contributing load sense input of the steering valve; and biasing the priority valve to block flow from the pump to the steering valve inlets using the opposing load sense input of the steering valve.

Controlling flow from the pump to the low priority function inlets using a priority valve and controlling a load sense cutoff valve using the steering valve dynamic load sense pressure can include hydraulically coupling the steering valve dynamic load sense pressure to an inlet port of the load sense cutoff valve and to a contributing load sense input of the priority valve; blocking the steering valve dynamic load sense pressure at the inlet port of the load sense cutoff valve when the steering valve dynamic load sense pressure is less than a threshold pressure; hydraulically coupling the inlet port of the load sense cutoff valve and the contributing load sense input of the priority valve through the load sense cutoff valve to a tank when the steering valve dynamic load sense pressure is greater than a threshold pressure; hydraulically coupling the outlet port of the steering valve to an opposing load sense input of the priority valve; biasing the priority valve to block flow from the pump to the low priority function inlets using a priority bias spring force and the contributing load sense input of the priority valve; and biasing the priority valve to open flow from the pump to the low priority function inlets using the opposing load sense input of the priority valve. Controlling flow from the pump to the steering valve inlets using a steering valve can include hydraulically coupling the outlet port of the steering valve to an inlet port of a load sense feed orifice; hydraulically coupling an outlet port of the load sense feed orifice to a contributing load sense input of the steering valve; hydraulically coupling the outlet port of the steering valve to an opposing load sense input of the steering valve; biasing the steering valve to open flow from the pump to the steering valve inlets using a steering bias spring force and the contributing load sense input of the steering valve; and biasing the priority valve to block flow from the pump to the steering valve inlets using the opposing load sense input of the steering valve.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

A dual pressure margin (two spool) priority circuit can be used to enable the steering circuit to utilize greater pump pressure. This can result in a steering capacity increase of over 10% without changing the steering cylinders or the steering valve.

Figure 1:
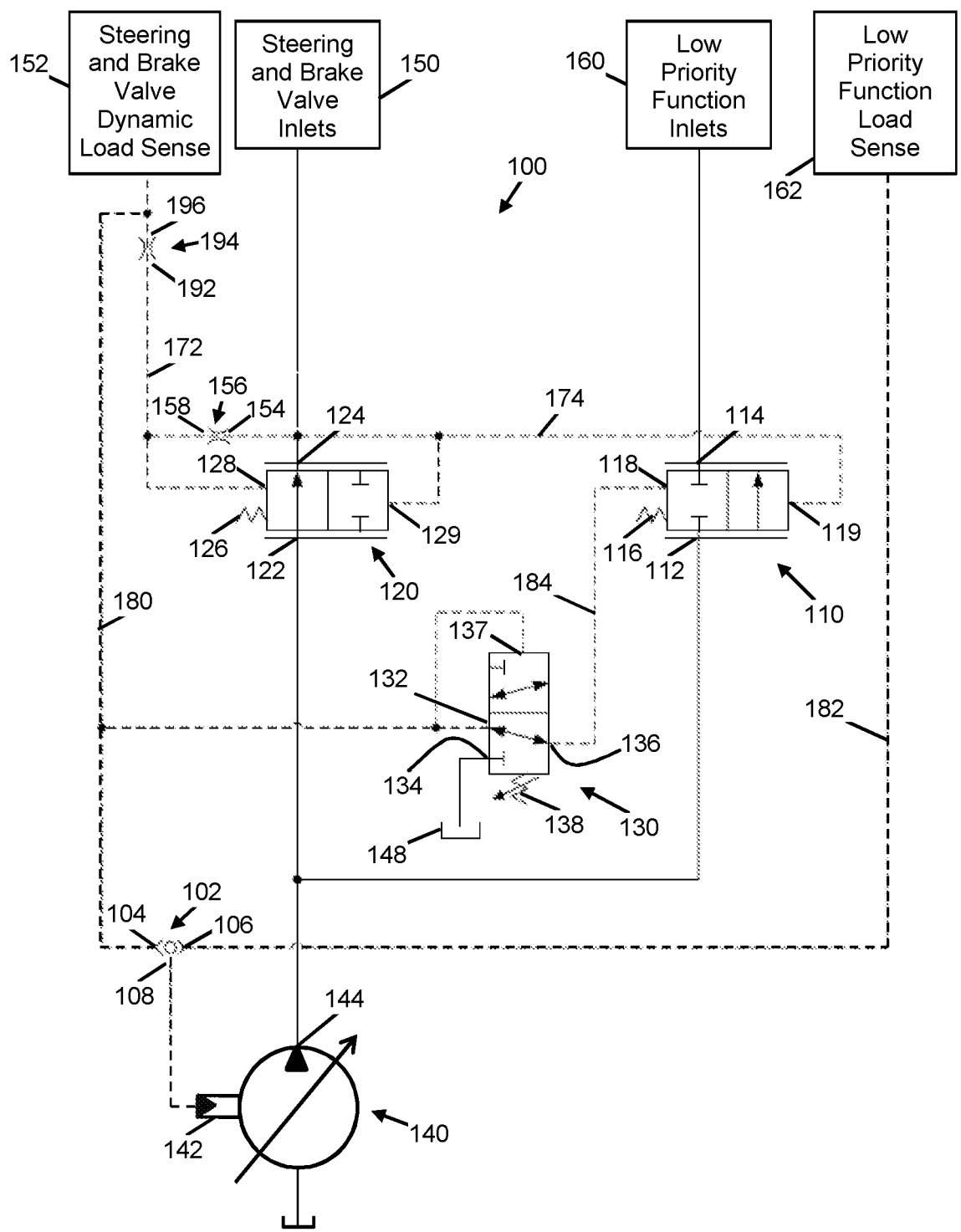
FIG. 1 illustrates an exemplary embodiment of a dual pressure margin priority circuit with a load sense cutoff valve.

FIG. 1 illustrates an exemplary embodiment of a dual pressure margin priority circuit 100 that can be used to enable the steering circuit to utilize greater pump pressure. The dual pressure margin priority circuit 100 includes a priority valve 110, a steering and brake pressure compensation valve 120, which is sometimes referred to as a steering valve 120, and a load sense cutoff valve 130. The dual pressure margin priority circuit 100 controls flow from a pressure compensated hydraulic source or pump 140 to steering and brake valve inlets 150, which are sometimes referred to as steering valve inlets 150, and to low priority function inlets 160. The pressure compensated hydraulic pump 140 includes a load sense input 142 and an outlet port 144. The dual pressure margin priority circuit 100 is also connected to a steering and brake valve dynamic load sense circuit 152 and to low priority function load sense circuit 162.

In the embodiment of FIG. 1, the priority valve 110 and the steering pressure compensation valve 120 are each 2-way proportional flow spool valves. The priority valve 110 includes an inlet port 112 and an outlet port 114 where the inlet port 112 is connected to the outlet port 144 of the pump 140, and the outlet port 114 of the priority valve 110 is connected to the low priority function inlets 160. The steering pressure compensation valve 120 includes an inlet port 122 and an outlet port 124 where the inlet port 122 is connected to the outlet port 144 of the pump 140, and the outlet port 124 of the steering pressure compensation valve 120 is connected to the steering valve inlets 150.

The steering pressure compensation valve 120 controls flow from the pump 140 to the steering valve inlets 150. The steering pressure compensation valve 120 includes a spring 126 that biases the steering pressure compensation valve 120 to allow flow from the pump 140 to the steering valve inlets 150. The steering pressure compensation valve 120 also includes a contributing load sense input 128 that aids the biasing force of the spring 126, and an opposing load sense input 129 that opposes the biasing force of the spring 126. The outlet 124 of the steering pressure compensation valve 120 is also connected to an opposing load sense line 174 and to a dynamic load sense feed orifice 156 having an inlet port 154 and an outlet port 158. The inlet port 154 of the dynamic load sense feed orifice 156 is connected to the outlet 124 of the steering pressure compensation valve 120, and the outlet port 158 of the dynamic load sense feed orifice 156 is connected to a load sense line 172. The dynamic load sense feed orifice 156 controls the amount of oil that flows through the load sense line 172.

The contributing load sense input 128 of the steering pressure compensation valve 120 is connected to the load sense line 172 which communicates the pressure from the outlet port 158 of the dynamic load sense feed orifice 156. The opposing load sense input 129 of the steering pressure compensation valve 120 is connected to the opposition load sense line 174 which communicates the pressure from the outlet port 124 of the steering pressure compensation valve 120. The pressure in the load sense line 172 at the contributing load sense input 128 aids the biasing force of the spring 126, and the pressure in the opposition load sense line 174 at the opposing load sense input 129 opposes these biasing forces. Thus, the contributing bias forces of the steering pressure compensation valve 120 are the sum of the bias forces from the spring 126 and the contributing load sense input 128. The load sense line 172 also connects the outlet port of the dynamic load sense feed orifice 156 to the steering valve dynamic load sense circuit 152.

The connection of the load sense line 172 to the steering and brake valve dynamic load sense circuit 152 can be through a dynamic load sense boost orifice 194 having an inlet port 192 and an outlet port 196. When the boost orifice 194 is included, the inlet port 192 of the boost orifice 194 is connected to the outlet port 158 of the dynamic load sense feed orifice 156 through load sense line 172, and the outlet port 196 of the boost orifice 194 is connected to the steering and brake valve dynamic load sense circuit 152.

The dual pressure margin priority circuit can include a load sense resolution shuttle valve 102 with a first inlet 104, a second inlet 106 and an outlet 108. A load sense line 180 connects the steering valve load sense circuit 152 to the first inlet 104 of the shuttle valve 102. A load sense line 182 connects the low priority function load sense circuit 162 to the second inlet 106 of the shuttle valve 102. The outlet 108 of the shuttle valve 102 is connected to the load sense input 142 of the pump 140 such that the pump 140 is always responsive to the higher of the load pressure signals from the load sense line 180 (for the steering valve load sense 152) and the load sense line 182 (for the low priority function load sense 162).

In the embodiment of FIG. 1, the load sense cutoff valve 130 is a 3-way, 2-position spool valve. The load sense cutoff valve 130 includes a first inlet port 132, a second inlet port 134, an outlet port 136, a load sense input 137 and a spring 138. The spring 138 biases the load sense cutoff valve 130 to connect the first inlet port 132 to the outlet port 136. The first inlet port 132 is connected to the load sense line 180 and the second inlet port 134 is connected to a reservoir or tank 148. The outlet port 136 is connected to a load sense line 184. The load sense line 180 is also connected to the load sense input 137 of the load sense cutoff valve 130 such that the pressure of the load sense line 180 at the load sense input 137 opposes the biasing force of the spring 138. When the biasing force of the spring 138 is greater than the pressure of the load sense line 180 at the load sense input 137, the load sense cutoff valve 130 connects the pressure from the load sense line 180 at the first inlet port 132 to the load sense line 184 at the outlet port 136. When the biasing pressure of the load sense line 180 at the load sense input 137 is greater than the biasing force of the spring 138, the load sense cutoff valve 130 connects the tank 148 at the second inlet port 134 to the load sense line 184 at the outlet port 136.

The priority valve 110 controls flow from the pump 140 to the low priority function inlets 160. The priority valve 110 includes a spring 116 that biases the priority valve 110 to block flow from the pump 140 to the low priority function inlets 160. The priority valve 110 also includes a contributing load sense input 118 that aids the biasing force of the spring 116, and an opposing load sense input 119 that opposes the biasing force of the spring 116. The contributing load sense input 118 is connected to the load sense line 184 from the outlet port 136 of the load sense cutoff valve 130. The opposing load sense input 119 is connected to the opposition load sense line 174 connected to the outlet port 124 of the steering pressure compensation valve 120. Thus, the contributing bias forces of the priority valve 110 are the sum of the bias forces from the spring 116 and the contributing load sense input 118. The margin between the contributing and opposing bias forces of the priority valve 110 is less than the margin between the contributing and opposing bias forces of the steering pressure compensation valve 120.

The biasing force of the spring 138 of the load sense cutoff valve 130 sets a cutoff pressure threshold, for example 175 bar. When the steering load sense pressure communicated on load sense line 180 to the load sense input 137 is less than the cutoff pressure threshold then the load sense cutoff valve 130 communicates the steering load sense pressure on the load sense line 180 to the outlet port 136 which is communicated to the contributing load sense input 118 to aid the bias spring 116 of the priority valve 110. In this condition, the contributing and opposing bias forces on the opposite sides of the spools of the priority valve 110 and the steering pressure compensation valve 120 are approximately the same except for the difference between the biasing force of the spring 116 of the priority valve 110 and the biasing force of the spring 126 of the steering pressure compensation valve 120. As noted above, the margin between the contributing and opposing bias forces of the priority valve 110 is less than the margin between the contributing and opposing bias forces of the steering pressure compensation valve 120. When the steering load sense pressure communicated on load sense line 180 to the load sense input 137 is less than the cutoff pressure threshold, the priority valve 110 controls the allocation of flow from the pump 140 to the steering valve inlets 150 and to the low priority function inlets 160, and the priority valve 110 controls the steering valve dynamic load sense 152. When the steering load sense pressure communicated on load sense line 180 to the load sense input 137 is less than the cutoff pressure threshold and there is no fluid flow to the low priority function inlets 160, the steering and brake pressure compensation valve 120 controls the allocation of flow from the pump 140 to the steering valve inlets 150 and controls the steering valve dynamic load sense 152.

There is a pressure margin or difference between the pressure at the output 144 of the pump 140 and the load sense pressure in load sense line 180, for example if the maximum pressure of pump 140 is 200 bar and when the pump 140 is at maximum pressure the pressure in line 180 could be 175 bar defining a pump pressure margin of 25 bar. The cutoff pressure threshold of the load sense cutoff valve 130 can be set to approximately equal the pressure value in load sense line 180 when the pump 140 is at maximum pressure, which in this example would be 175 bar. When the steering load sense pressure communicated on load sense line 180 to the load sense input 137 is greater than the cutoff pressure threshold, the load sense cutoff valve 130 connects the load sense line 184 to tank 148 which disables the priority valve 110. With essentially no assistance from pressure at the contributing load sense input 118, the pressure in opposition load sense line 174 at the opposing load sense input 119 overcomes the bias force of the spring 116 and fully opens the priority valve 110. The pressure on load sense line 172 at the contributing load sense input 128 along with the bias force of spring 126 overcomes the opposing pressure of the opposition load sense line 174 at the opposing load sense input 129 to also fully open the steering pressure compensation valve 120.

Thus when steering and brake load sense pressure on load sense line 180 at the load sense input 137 is greater than the cutoff pressure threshold, full pressure from the pump 140 is available to the steering and brake valve inlets 150 as long as the demanded pump flow from the steering and brake inlets 150 and low priority function inlets 160 does not exceed the maximum flow capacity of the pump 140. In the case where pump flow capacity is exceeded, then flow pressure equal to the pump controller pressure margin plus the cutoff pressure threshold is available at the steering and brake valve inlets 150.

A typical load sense relief circuit limits pressure to the steering valve inlets 150 to the maximum pump pressure minus the pump controller pressure margin, which in our example is 175 bar, to prevent blocking flow to the low priority function inlets 160. The dual pressure margin priority circuit 100 opens flow to both the low priority function inlets 160 and the steering and brake valve inlets 150 when the steering and brake load sense pressure is greater than or equal to the cutoff pressure threshold, so that substantially all of the maximum pump pressure, in this example 200 bar, is available to both the steering and brake valve inlets 150 and the low priority function inlets 160. Thus, this increases the available pressure by the pump controller pressure margin, in this case 25 bar. In this configuration, priority is maintained for the steering valve inlets 150 until the pump 140 reaches maximum pressure. When the pump 140 is at or near maximum pressure, both the priority valve 110 and the steering pressure compensation valve 120 are fully open to maximize the pressure at both the steering valve inlets 150 and the low priority function inlets 160 and to provide approximately equal pressure to both the steering valve inlets 150 and the low priority function inlets 160.

Figure 2:
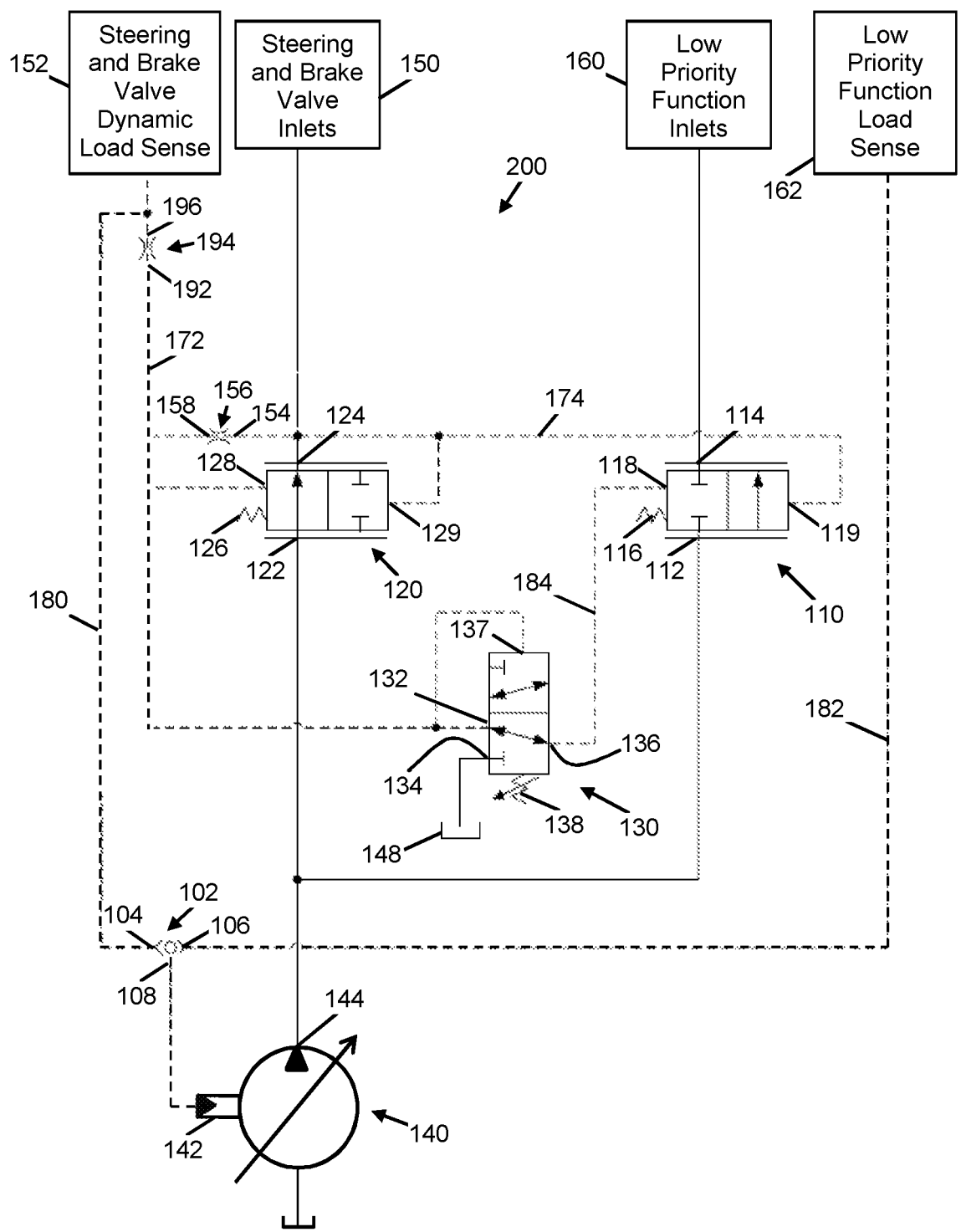
FIG. 2 illustrates another exemplary embodiment of a dual pressure margin priority circuit with a load sense cutoff valve.

FIG. 2 illustrates another exemplary embodiment of a dual pressure margin priority circuit 200 that can be used to enable the steering circuit to utilize greater pump pressure. The dual pressure margin priority circuit 200 also includes a priority valve 110, a steering and brake pressure compensation valve 120, and a load sense cutoff valve 130, where the dual pressure margin priority circuit 200 controls flow from a pressure compensated hydraulic source or pump 140 to steering and brake valve inlets 150 and to low priority function inlets 160. The primary difference in the dual pressure margin priority circuit 200 of FIG. 2 is that the first inlet port 132 and the load sense input 137 of the load sense cutoff valve 130 are connected to the load sense line 172 instead of the load sense line 180. Both of the load sense lines 172 and 180 are connected to the steering and brake dynamic load sense inputs 152. However, if a dynamic load sense boost orifice 194 is included, then the load sense line 172 is connected to the inlet port 192 of the boost orifice 194, and the load sense line 180 and the steering dynamic load sense inputs 152 are connected to the outlet port 196 of the boost orifice 194. In the dual pressure margin priority circuit 200, the boost orifice 194 will not affect load sense pressure between the outlet port 158 of the dynamic load sense feed orifice 156 and the load sense input 137 of the load sense cutoff valve 130 which is connected directly to the load sense line 172. Whereas in the dual pressure margin priority circuit 100 of FIG. 1, the boost orifice 194 will affect load sense pressure between the outlet port 158 of the dynamic load sense feed orifice 156 and the load sense input 137 of the load sense cutoff valve 130 which is connected directly to the load sense line 180. The dual pressure margin priority circuit 200 of FIG. 2 can provide more consistent pre-boost steering and brake dynamic load sense flow for some applications.

Figure 3:
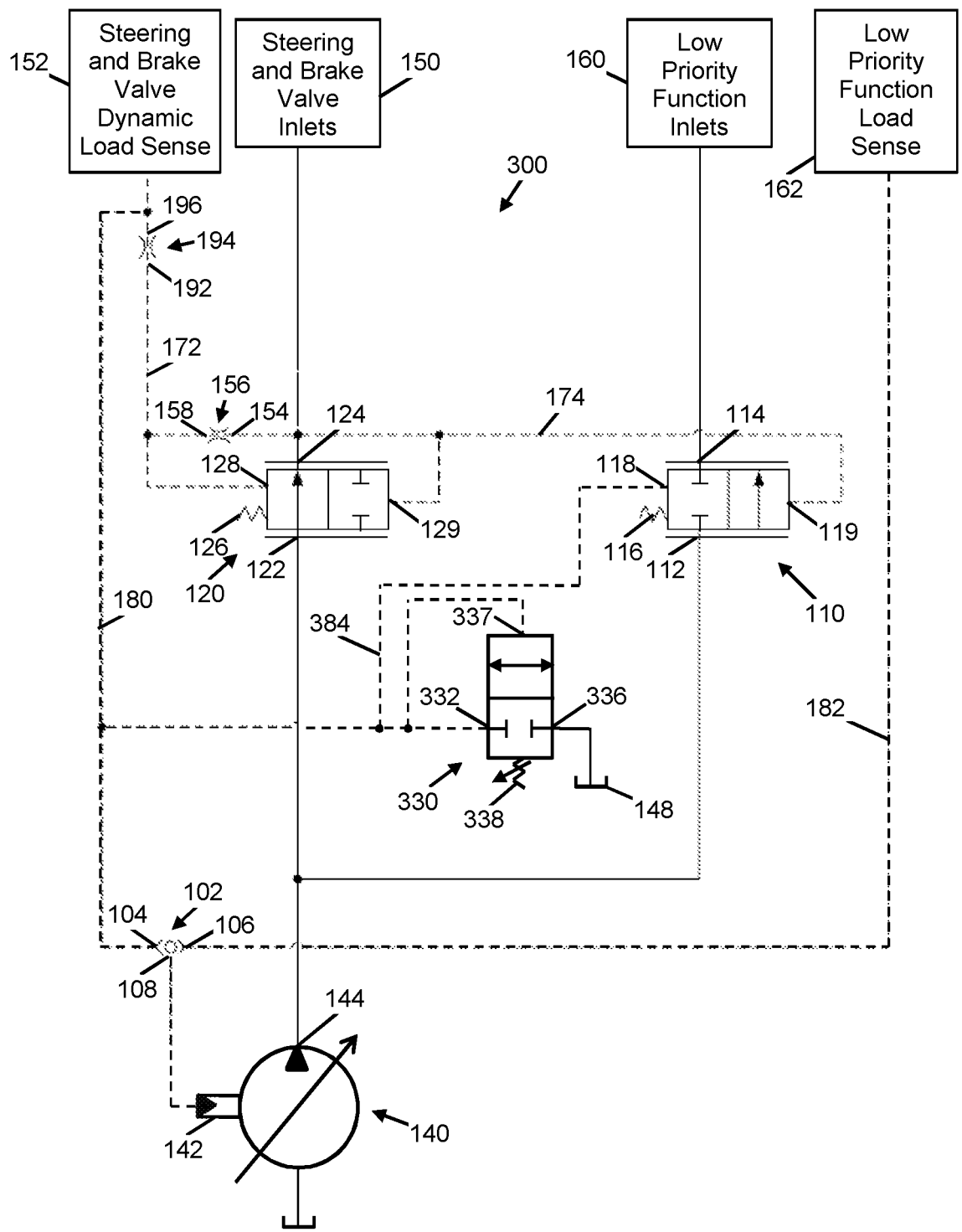
FIG. 3 illustrates an exemplary embodiment of a dual pressure margin priority circuit with a pressure limiter valve.

FIG. 3 illustrates yet another exemplary embodiment of a dual pressure margin priority circuit 300 that can be used to enable the steering circuit to utilize greater pump pressure. The dual pressure margin priority circuit 300 also includes a priority valve 110 and a steering and brake pressure compensation valve 120, but it uses a pressure limiter valve 330 as the load sense cutoff valve. As in the prior embodiments, the dual pressure margin priority circuit 300 controls flow from a pressure compensated hydraulic source or pump 140 to steering and brake valve inlets 150 and to low priority function inlets 160.

The pressure limiter load sense cutoff valve 330 is a 2-way, 2-position spool valve that includes an inlet port 332, an outlet port 336, a load sense input 337 and a spring 338. The inlet port 332 is connected to the load sense line 180 and the outlet port 336 is connected to a reservoir or tank 148. The spring 338 biases the load sense cutoff valve 330 to block the inlet port 332 and the outlet port 336. The load sense line 180 is also connected to the load sense input 337 of the pressure limiter valve 330 such that the pressure of the load sense line 180 at the load sense input 337 opposes the biasing force of the spring 338. When the biasing force of the spring 338 is greater than the pressure of the load sense line 180 at the load sense input 337, the pressure limiter valve 330 blocks the inlet port 332 and the outlet port 336. When the biasing pressure of the load sense line 180 at the load sense input 337 is greater than the biasing force of the spring 338, the pressure limiter valve 330 connects the inlet port 332 to the outlet port 336 which connects the load sense line 180 to the tank 148. Thus, the pressure limiter valve 330 limits the pressure in the load sense line 180 to the level that balances the biasing force of the spring 338.

The priority valve 110 controls flow from the pump 140 to the low priority function inlets 160. The priority valve 110, as above, includes a spring 116 that biases the priority valve 110 to block flow from the pump 140 to the low priority function inlets 160. The priority valve 110 also includes a contributing load sense input 118 that aids the biasing force of the spring 116, and an opposing load sense input 119 that opposes the biasing force of the spring 116. However, in the embodiment of FIG. 3, the contributing load sense input 118 is connected to a load sense line 384 that is directly connected to the load sense line 180. The opposing load sense input 119 is connected to the opposition load sense line 174 connected to the outlet port 124 of the steering pressure compensation valve 120. Thus, the contributing bias forces of the priority valve 110 are the sum of the bias forces from the spring 116 and the contributing load sense input 118 which is connected to the load sense line 384. The margin between the opposing bias forces of the priority valve 110 is less than the margin between the opposing bias forces of the steering pressure compensation valve 120.

The biasing force of the spring 338 of the pressure limiter valve 330 sets a cutoff pressure threshold, for example 175 bar. When the steering load sense pressure communicated on load sense line 180 to the load sense input 337 is less than the cutoff pressure threshold then the pressure limiter valve 330 blocks the inlet port 332 and the steering load sense pressure on the load sense line 180 is communicated to the contributing load sense input 118 to aid the bias spring 116 of the priority valve 110. In this condition, the contributing and opposing bias forces on the opposite sides of the spools of the priority valve 110 and the steering pressure compensation valve 120 are approximately the same except for the difference between the biasing force of the spring 116 of the priority valve 110 and the biasing force of the spring 126 of the steering pressure compensation valve 120. As noted above, the margin between the contributing and opposing bias forces of the priority valve 110 is less than the margin between the contributing and opposing bias forces of the steering pressure compensation valve 120. When the steering load sense pressure communicated on load sense line 180 to the load sense input 337 is less than the cutoff pressure threshold, the priority valve 110 controls the allocation of flow from the pump 140 to the steering valve inlets 150 and to the low priority function inlets 160, and the priority valve 110 controls the steering valve dynamic load sense 152. When the steering load sense pressure communicated on load sense line 180 to the load sense input 337 is less than the cutoff pressure threshold and there is no fluid flow to the low priority function inlets 160, the steering and brake pressure compensation valve 120 controls the allocation of flow from the pump 140 to the steering valve inlets 150 and controls the steering valve dynamic load sense 152.

There is a pressure margin or difference between the pressure at the output 144 of the pump 140 and the load sense pressure in load sense line 180, for example if the maximum pressure of pump 140 is 200 bar and when the pump 140 is at maximum pressure the pressure in line 180 could be 175 bar defining a pump pressure margin of 25 bar. The cutoff pressure threshold of the load sense cutoff valve 330 can be adjusted to approximately equal the pressure value in load sense line 180 when the pump 140 is at maximum pressure, which in this example would be 175 bar. The pressure limiter valve 330 limits the steering load sense pressure communicated on load sense line 180 to the cutoff pressure threshold set by the bias spring 338. The pressure limiter valve 330 releases any excess pressure of the steering valve dynamic load sense lines including on the load sense lines 180 and 384 to tank 148. This limited condition communicates the threshold pressure on load sense line 384 to the contributing load sense input 118 to aid the bias force of spring 116 opposing the pressure in opposing load sense line 174 communicated to the opposing load sense input 119. This fully opens the priority valve 110. The pressure on load sense line 172 at the contributing load sense input 128 along with the bias force of spring 126 overcomes the opposing pressure of the opposition load sense line 174 at the opposing load sense input 129 to also fully open the steering pressure compensation valve 120.

The dual pressure margin priority circuit 300 of FIG. 3 can provide a lower cost option because the 2-way, 2-position pressure limiter spool valve 330 is lower cost than the 3-way, 2-position selector spool valve 130. The pressure limiter spool valve 330 can be manufactured with a simple spool or poppet and a spring. The load sense cutoff selector spool valve 130 requires a more complex spool (3-way vs 2-way) and more internal manifold porting. The trade-off is part cost for oil flow. The pressure limiter does waste some oil when in the pressure limiting mode.

Figure 4:
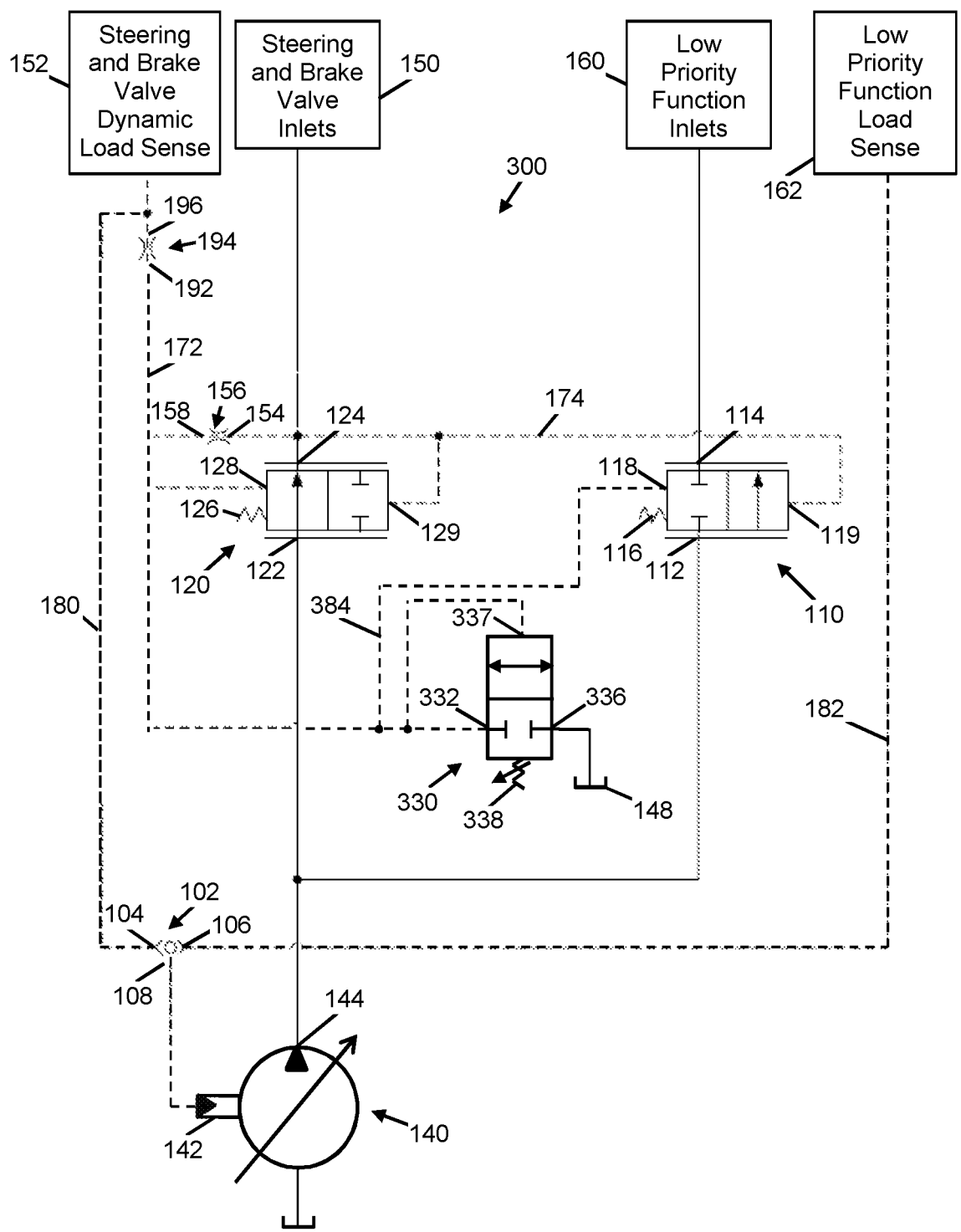
FIG. 4 illustrates another exemplary embodiment of a dual pressure margin priority circuit with a pressure limiter valve.

The primary difference in the dual pressure margin priority circuit 400 of FIG. 4 and the dual pressure margin priority circuit 300 of FIG. 3 is that the first inlet port 332 and the load sense input 337 of the pressure limiter valve 330, and the load sense line 384 are connected to the load sense line 172 instead of the load sense line 180. Both of the load sense lines 172 and 180 are connected to the steering and brake dynamic load sense inputs 152. However, if a dynamic load sense boost orifice 194 is included, then the load sense line 172 is connected to the inlet port 192 of the boost orifice 194, and the load sense line 180 and the steering dynamic load sense inputs 152 are connected to the outlet port 196 of the boost orifice 194. In the dual pressure margin priority circuit 400 the boost orifice 194 will not affect load sense pressure between the outlet port 158 of the dynamic load sense feed orifice 156 and the load sense input 337 of the pressure limiter valve 330 which is connected directly to the load sense line 172. Whereas in the dual pressure margin priority circuit 300 of FIG. 3, the boost orifice 194 will affect load sense pressure between the outlet port 158 of the dynamic load sense feed orifice 156 and the load sense input 337 of the pressure limiter valve 330 which is connected directly to the load sense line 180. The dual pressure margin priority circuit 400 of FIG. 4 can provide more consistent pre-boost steering and brake dynamic load sense flow for some applications.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A method of controlling flow from a hydraulic pump to steering valve inlets and to low priority function inlets, the method comprising:
    controlling flow from the pump to the steering valve inlets using a steering valve;
    sensing a steering valve dynamic load sense pressure at an outlet port of the steering valve;
    controlling flow from the pump to the low priority function inlets using a priority valve, the priority valve being separate from the steering valve;
    controlling a load sense cutoff valve using the steering valve dynamic load sense pressure;
    controlling flow from the pump to the low priority function inlets through the priority valve using the load sense cutoff valve based on the steering valve dynamic load sense pressure.

2. The method of claim 1, wherein controlling a load sense cutoff valve using the steering valve dynamic load sense pressure comprises:
    hydraulically coupling the steering valve dynamic load sense pressure through the load sense cutoff valve from an inlet port of the load sense cutoff valve to a load sense input of the priority valve when the steering valve dynamic load sense pressure is less than a threshold pressure; and
    hydraulically coupling the load sense input of the priority valve through the load sense cutoff valve from an outlet port of the load sense cutoff valve to a tank when the steering valve dynamic load sense pressure is greater than a threshold pressure.

3. The method of claim 2, wherein controlling flow from the pump to the low priority function inlets using a priority valve comprises:
    hydraulically coupling the outlet port of the load sense cutoff valve to a contributing load sense input of the priority valve;
    hydraulically coupling the outlet port of the steering valve to an opposing load sense input of the priority valve; and
    biasing the priority valve to block flow from the pump to the low priority function inlets using a priority bias spring force and the contributing load sense input of the priority valve;
    biasing the priority valve to open flow from the pump to the low priority function inlets using the opposing load sense input of the priority valve.

4. The method of claim 3, wherein controlling flow from the pump to the steering valve inlets using a steering valve comprises:
    hydraulically coupling the outlet port of the steering valve to an inlet port of a load sense feed orifice;
    hydraulically coupling an outlet port of the load sense feed orifice to a contributing load sense input of the steering valve;
    hydraulically coupling the outlet port of the steering valve to an opposing load sense input of the steering valve; and
    biasing the steering valve to open flow from the pump to the steering valve inlets using a steering bias spring force and the contributing load sense input of the steering valve;
    biasing the priority valve to block flow from the pump to the steering valve inlets using the opposing load sense input of the steering valve.

5. The method of claim 1, wherein controlling flow from the pump to the low priority function inlets using a priority valve and controlling a load sense cutoff valve using the steering valve dynamic load sense pressure comprises:
    hydraulically coupling the steering valve dynamic load sense pressure to an inlet port of the load sense cutoff valve and to a contributing load sense input of the priority valve;
    blocking the steering valve dynamic load sense pressure at the inlet port of the load sense cutoff valve when the steering valve dynamic load sense pressure is less than a threshold pressure; and
    hydraulically coupling the inlet port of the load sense cutoff valve and the contributing load sense input of the priority valve through the load sense cutoff valve to a tank when the steering valve dynamic load sense pressure is greater than a threshold pressure;
    hydraulically coupling the outlet port of the steering valve to an opposing load sense input of the priority valve;
    biasing the priority valve to block flow from the pump to the low priority function inlets using a priority bias spring force and the contributing load sense input of the priority valve; and
    biasing the priority valve to open flow from the pump to the low priority function inlets using the opposing load sense input of the priority valve.

6. The method of claim 5, wherein controlling flow from the pump to the steering valve inlets using a steering valve comprises:
    hydraulically coupling the outlet port of the steering valve to an inlet port of a load sense feed orifice;
    hydraulically coupling an outlet port of the load sense feed orifice to a contributing load sense input of the steering valve;
    hydraulically coupling the outlet port of the steering valve to an opposing load sense input of the steering valve; and
    biasing the steering valve to open flow from the pump to the steering valve inlets using a steering bias spring force and the contributing load sense input of the steering valve;
    biasing the priority valve to block flow from the pump to the steering valve inlets using the opposing load sense input of the steering valve.

7. The method of claim 1, wherein controlling a load sense cutoff valve using the steering valve dynamic load sense pressure comprises:
    biasing the load sense cutoff valve to block flow from the outlet port of the steering valve from passing through the load sense cutoff valve when the steering valve dynamic load sense pressure is less than a threshold pressure.

8. The method of claim 7, further comprising:
hydraulically coupling the outlet port of the steering valve to the priority valve through a load sense line that bypasses the load sense cutoff valve.

9. A method of controlling flow from a hydraulic pump to steering valve inlets and to low priority function inlets, the method comprising:
controlling flow from the pump to the steering valve inlets using a steering valve;
sensing a steering valve dynamic load sense pressure at a first load sense line hydraulically coupled between an outlet port of the steering valve and an input port of a load sense cutoff valve;
controlling flow from the pump to the low priority function inlets using a priority valve, the priority valve being separate from the steering valve;
controlling the load sense cutoff valve using the steering valve dynamic load sense pressure;
controlling flow from the pump to low priority function inlets through the priority valve using the load sense cutoff valve based on the steering valve dynamic load sense pressure.

10. The method of claim 9, wherein controlling a load sense cutoff valve using the steering valve dynamic load sense pressure comprises:
hydraulically coupling the first load sense line through the load sense cutoff valve to a load sense input of the priority valve when the steering valve dynamic load sense pressure is less than a threshold pressure.

11. The method of claim 10, wherein controlling a load sense cutoff valve using the steering valve dynamic load sense pressure comprises:
hydraulically coupling the first load sense line through the load sense cutoff valve to a reservoir when the steering valve dynamic load sense pressure is greater than a threshold pressure.

12. The method of claim 9, wherein controlling a load sense cutoff valve using the steering valve dynamic load sense pressure comprises:
biasing the load sense cutoff valve to block flow from the first load sense line from passing through the load sense cutoff valve when the steering valve dynamic load sense pressure is less than a threshold pressure.

13. The method of claim 12, further comprising:
hydraulically coupling the first load sense line to the priority valve through a second load sense line that bypasses the load sense cutoff valve.

\* \* \* \* \*